No. 822,158. PATENTED MAY 29, 1906.
F. SEWARD.
HORSESHOEING STAND.
APPLICATION FILED AUG. 29, 1905.
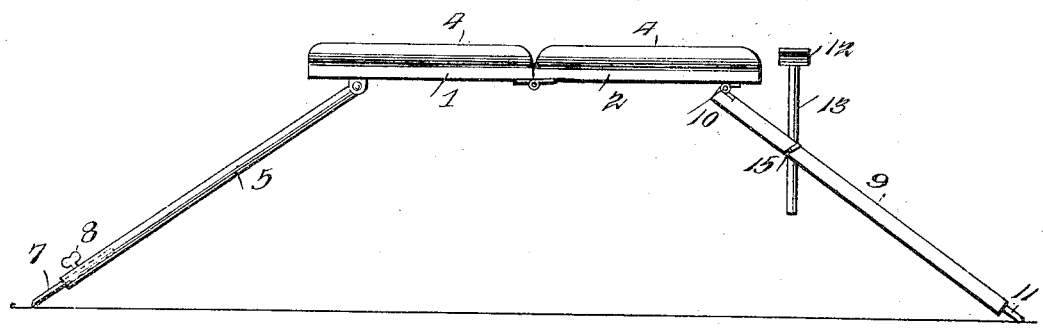
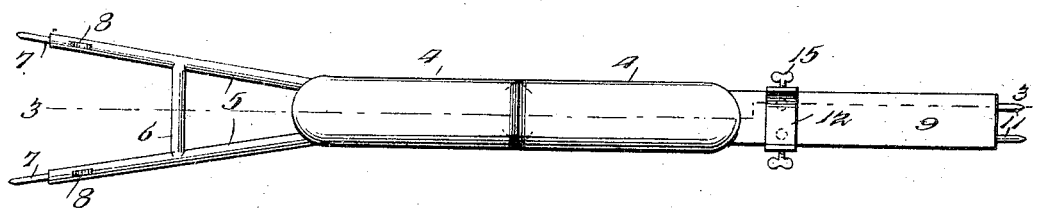
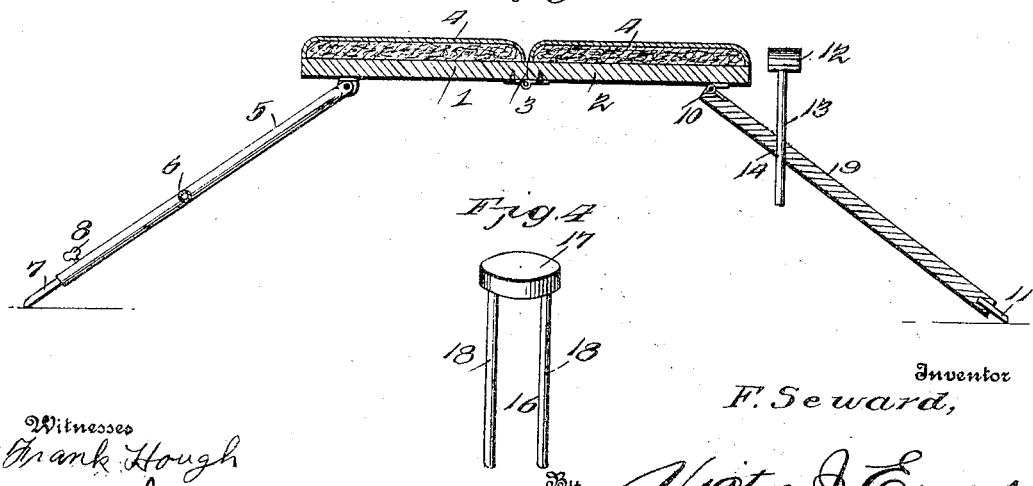
Witnesses
Frank Hough
D. W. Gould.
Inventor
F. Seward,
By Victor J. Evans
Attorney

UNITED STATES PATENT OFFICE.

FRANK SEWARD, OF WENTWORTH, MISSOURI.

HORSESHOEING-STAND.

No. 822,158.　　　　Specification of Letters Patent.　　　　Patented May 29, 1906.

Application filed August 29, 1905. Serial No. 276,275.

*To all whom it may concern:*

Be it known that I, FRANK SEWARD, a citizen of the United States, residing at Wentworth, in the county of Newton and State of Missouri, have invented new and useful Improvements in Horseshoeing-Stands, of which the following is a specification.

The invention relates to an improvement in horseshoeing-stands designed particularly for supporting the feet of the animal during the shoeing operation.

The main object of the present invention is the production of an adjustable stand in which provision is made for properly positioning and supporting the legs of the animal during the shoeing operation, the construction readily accommodating the legs of horses of different sizes.

The invention will be described in detail in the following specification, reference being had particularly to the accompanying drawings, in which—

Figure 1 is a side elevation of a shoeing-stand constructed in accordance with my invention; Fig. 2, a plan view of the same; Fig. 3, a vertical section of the same; Fig. 4, a perspective of the clench-iron.

Referring to the drawings, my improved shoeing-stand comprises a knee-rest made in two sections 1 and 2 and comprising elongated strips of wood or metal hinged together at their ends, as at 3, thus providing an elongated strip centrally hinged to provide for desired adjustment. By preference the strips 1 and 2 are covered with suitable padding 4 to prevent injury to the leg of the animal. At the free end the strip 1 is provided with a support comprising divergent pipe members 5, connected centrally of their lengths by a cross-bar 6. Supports 7 are movably fitted in the lower open ends of the sections 5 and held in adjusted position therein through the medium of set-screws 8. The free end of section 2 is also similarly supported through the medium of a bar 9, practically coextensive in width with the section 2 and hinged thereto, as at 10. Holding-spurs 11 are fixedly secured in the lower end of the plate 9 to prevent slipping when the stand is in use.

A foot-rest 10 is arranged for adjustable connection with the bar 9, said foot-rest comprising a concave plate 12 to receive the foot of the animal, from which plate rods 13 depend. The rods are preferably two in number and adapted to engage openings 14, formed in the bar 9, set-screws 15, carried by the bar, being adapted to engage the rods and maintain the foot-rest in the desired elevated position with relation to the stand proper.

I also contemplate the use of a clencher-rest 16 in conjunction with the bar 9, said clencher-rest comprising a plate cylindrical in plan, as 17, from which depends rods 18, adapted for engagement with the openings 14 in the bar 9, it being understood that the toe-rest is used for supporting the toe of the animal during the application of the shoe to the hoof and that the clencher-rest is used to support the hoof in a comparatively upright position for clenching the nails.

In use the supports 5 and 9 are adjusted to provide the desired height, and said rests are adjusted with relation to each other to arrange the respective sections 1 and 2 of the standard at the desired angle to each other necessary to properly support the leg of the animal. The toe or hoof of the animal will be supported in the rest 12, and after proper application of the shoe said rest is removed and the clencher-rest 16 applied, permitting the hoof of the animal to rest in a comparatively upright position thereon to provide for easy clenching of the nails inserted to hold the shoe.

The invention is simple in construction and provides an effective rest for the leg of the animal during the shoeing operation, thereby facilitating the work and relieving the shoer of the weight incident to the ordinary shoeing operation and enabling him to avoid the danger and annoyance of such operation.

Having thus described the invention, what is claimed as new is—

1. A shoeing-stand comprising a knee-rest made in sections hinged together, and supports for the free ends of the sections, one of said supports being longitudinally adjustable.

2. A knee-rest comprising hinged strips, and adjustable supports for the free end of one of said strips, a support for the free end of the other of the strips, and an auxiliary rest adjustably connected with the latter support.

3. A shoeing-stand comprising a knee-rest made in movably-connected sections, an adjustable support for the free end of one section, a support for the free end of the other section, said latter support being hinged to its section, and an auxiliary rest adjustably connected with said support.

4. In a shoeing-stand a knee-rest comprising movably-connected sections, a padded covering for each section, supports for the free ends of the respective sections, and an auxiliary rest adapted for adjustable connection with one of the supports.

In testimony whereof I affix my signature in presence of two witnesses.

FRANK SEWARD.

Witnesses:
W. T. LECAMPTE,
G. G. ADAMS.